(12) United States Patent
Fisk et al.

(10) Patent No.: US 8,708,093 B2
(45) Date of Patent: Apr. 29, 2014

(54) ACOUSTIC COVER FOR VEHICLE FUEL INJECTION PUMP

(75) Inventors: Jonathan W. Fisk, Canton, MI (US); James F. Keys, Northville, MI (US)

(73) Assignee: Shiloh Industries, Inc., Valley City, OH (US)

( * ) Notice: Subject to any disclaimer, the term of this patent is extended or adjusted under 35 U.S.C. 154(b) by 0 days.

(21) Appl. No.: 13/580,565

(22) PCT Filed: Feb. 18, 2011

(86) PCT No.: PCT/US2011/025361
§ 371 (c)(1),
(2), (4) Date: Aug. 22, 2012

(87) PCT Pub. No.: WO2011/106244
PCT Pub. Date: Sep. 1, 2011

(65) Prior Publication Data
US 2012/0315159 A1    Dec. 13, 2012

Related U.S. Application Data

(60) Provisional application No. 61/307,158, filed on Feb. 23, 2010.

(51) Int. Cl.
*F02B 77/13* (2006.01)
(52) U.S. Cl.
USPC ........................................................ 181/204
(58) Field of Classification Search
USPC ........................................................ 181/204
See application file for complete search history.

(56) References Cited

U.S. PATENT DOCUMENTS

| 7,357,219 | B2 * | 4/2008 | Mafi et al. ..................... | 181/202 |
| 7,770,692 | B2 * | 8/2010 | Hazelton et al. ............... | 181/290 |
| 8,122,867 | B2 * | 2/2012 | Fonville et al. ............ | 123/198 C |
| 2003/0010566 | A1 * | 1/2003 | Miyakawa et al. ........... | 181/204 |
| 2006/0054385 | A1 * | 3/2006 | Rackers et al. ............... | 181/290 |
| 2006/0175126 | A1 * | 8/2006 | Nakamoto et al. ............ | 181/290 |
| 2009/0000601 | A1 | 1/2009 | Takata | |
| 2009/0044783 | A1 * | 2/2009 | Fischer et al. ................ | 123/495 |

FOREIGN PATENT DOCUMENTS

| JP | 62188523 | 12/1987 |
| JP | 2008175071 | 7/2008 |

OTHER PUBLICATIONS

Written Opinion & International Search Report for PCT/US11/025361 Oct. 7, 2011, 9 pages.

* cited by examiner

*Primary Examiner* — Forrest M Phillips
(74) *Attorney, Agent, or Firm* — Reising Ethington P.C.

(57) ABSTRACT

A high-pressure fuel injection pump, including a sound-damping acoustic cover, is mounted on an engine and is part of a direct-inject fuel system for a vehicle. In an exemplary embodiment, the acoustic cover includes a top portion that fits over the fuel injection pump and a side portion that mechanically engages the fuel injection pump, and at least one of the top or side portions is formed from a sound-damping metal laminate material. Sound and/or vibrations that emanate from the fuel injection pump may be transferred to the acoustic cover and converted into thermal energy by the sound-damping metal laminate material.

19 Claims, 2 Drawing Sheets

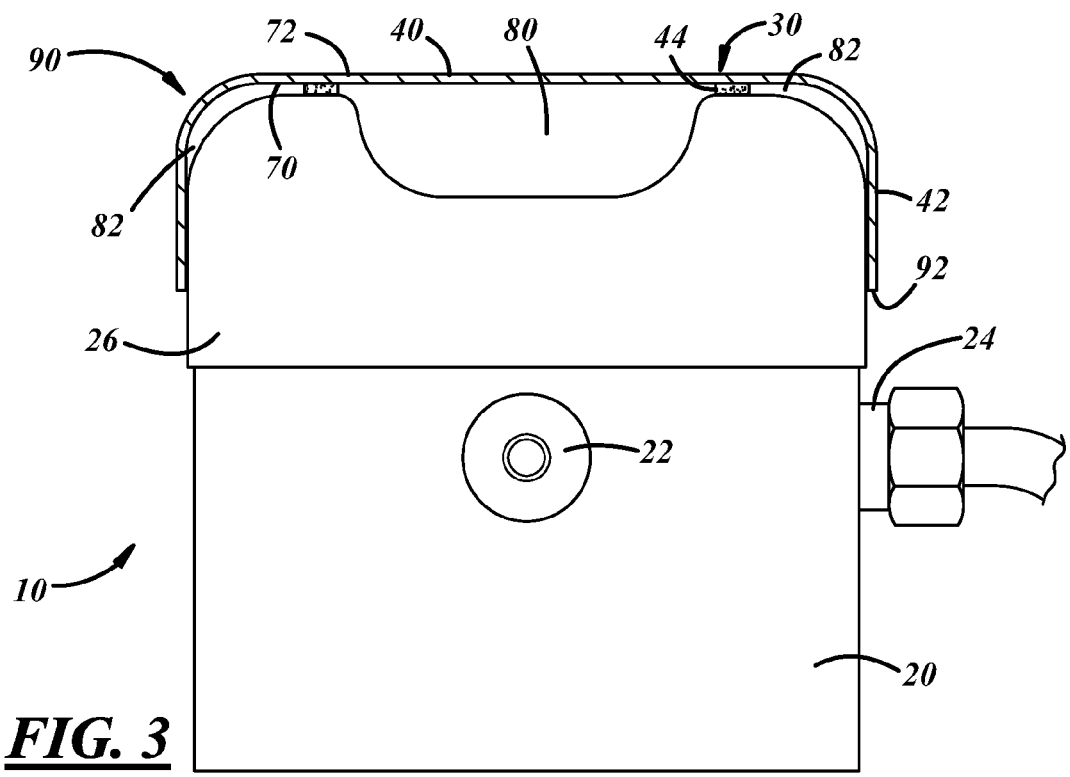
FIG. 3
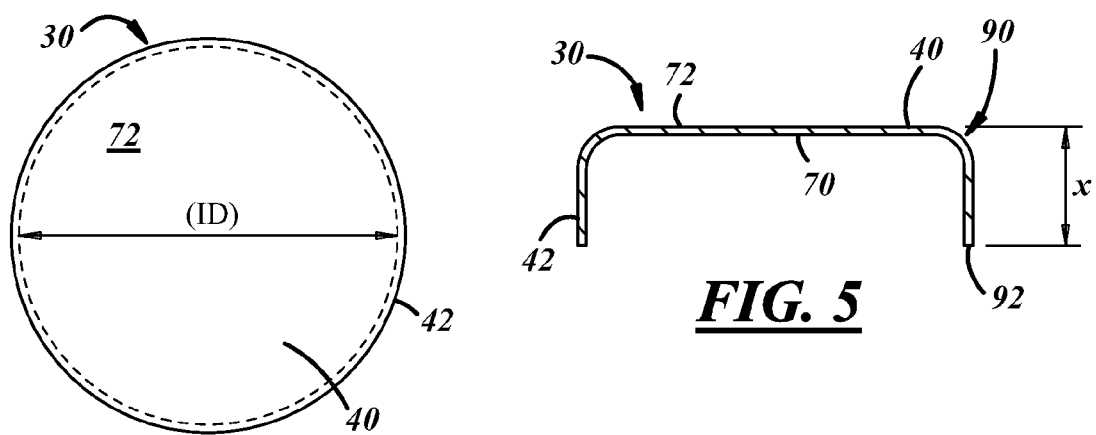
FIG. 4
FIG. 5
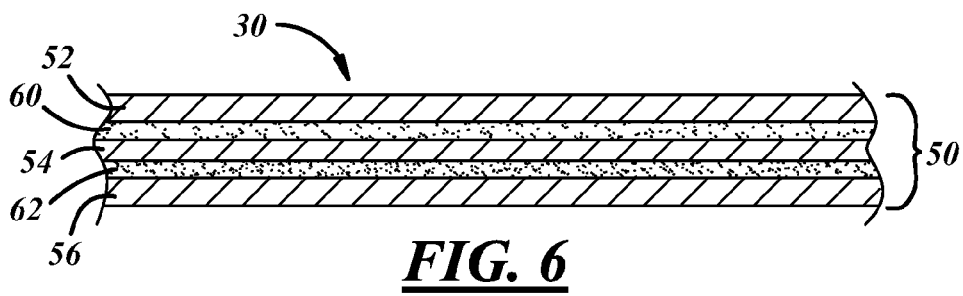
FIG. 6

ACOUSTIC COVER FOR VEHICLE FUEL INJECTION PUMP

REFERENCE TO RELATED APPLICATIONS

This application claims the benefit of U.S. Provisional Ser. No. 61/307,158 filed on Feb. 23, 2010. The entire contents of which are incorporated herein by reference.

FIELD OF INVENTION

The present invention generally relates to an acoustic cover and, more particularly, to a sound-damping acoustic cover for a vehicle fuel injection pump.

BACKGROUND

Certain engines may require that the fuel be significantly pressurized in order to operate properly. For example, some types of direct-inject engines (e.g., common rail fuel injection (CRFI) in diesel engines, gasoline direct injection (GDI) in gasoline engines, etc.) may require that the fuel be pressurized to more than 1,000 psi before being introduced into the combustion chamber. In such engines, the fuel is stored in a fuel tank, is initially pumped by a low-pressure pump that delivers the fuel from the low-pressure pump to a high-pressure pump, and is then further pressurized by a high-pressure pump so that the fuel can be introduced into the combustion chamber at a significantly elevated pressure. In some instances, the high-pressure pump is mechanically coupled to and driven by the engine (e.g., a piston pump mechanically coupled to an engine camshaft).

Because the high-pressure pump is mechanically driven by the camshaft or some other engine component, as well as the fact that it is providing significantly pressurized fuel, the high-pressure pump may generate significant amounts of sound and/or vibrations that are undesirable to the occupants of the vehicle.

SUMMARY

According to one aspect, there is provided an acoustic cover for a fuel injection pump that comprises: a top portion and a side portion extending from the top portion. At least one of the top portion or the side portion includes a sound-damping metal laminate material that damps sound and/or vibrations that emanate from the fuel injection pump.

According to another aspect, there is provided an acoustic cover for a fuel injection pump that comprises: a top portion and a side portion. The top portion is sized and shaped to fit over a top of the fuel injection pump when mounted, and the side portion is sized and shaped to mechanically engage a side of the fuel injection pump when mounted. The side of the fuel injection pump and the side portion of the acoustic cover are acoustically coupled to one another so that sound and/or vibrations that emanate from the fuel injection pump are transferred to and damped by the acoustic cover.

According to another aspect, there is provided a high-pressure fuel injection pump for a vehicle that comprises: a pump housing, an inlet in the pump housing, an outlet in the pump housing, a pump device, and an acoustic cover. The acoustic cover is mounted to the pump housing and has a sound-damping metal laminate material that dampens noise emanating from the high-pressure fuel injection pump.

According to another aspect, there is provided a method for damping sound and/or vibrations that emanate from a high-pressure fuel injection pump. The method may comprise the steps of: (a) providing an acoustic cover that includes a top portion and a side portion, wherein at least one of the top portion and the side portion is made from a sound-damping metal laminate material; (b) mounting the acoustic cover to the high-pressure fuel injection pump via a mechanical engagement between a side of the high-pressure fuel injection pump and the side portion of the acoustic cover; (c) receiving sound and/or vibrations having a frequency between 500 Hz and 12,000 Hz from the high-pressure fuel injection pump at the acoustic cover; and (d) damping the sound and/or vibrations by converting at least some of the acoustic energy associated with the sound and/or vibrations into thermal energy within the sound-damping metal laminate material.

DESCRIPTION OF THE DRAWINGS

A preferred exemplary embodiment of the invention will hereinafter be described in conjunction with the appended drawings, wherein like designations denote like elements, and wherein:

FIG. 3 is a cross-sectional view of the high-pressure fuel injection pump from FIG. 2;

FIG. 4 is a top view of the acoustic cover from FIG. 3;

FIG. 5 is a side view of the acoustic cover from FIG. 3; and

FIG. 6 is a cross-sectional view of the acoustic cover from FIG. 3, where the acoustic cover includes a sound-damping laminate material that includes alternating metal and adhesive layers.

DESCRIPTION OF PREFERRED EMBODIMENT

Certain vehicle components, such as those operating at high speeds and frequencies, can emit noise and vibrations that are undesirable to vehicle passengers. An example of one such vehicle component is a high-pressure fuel injection pump—also referred to as a fuel injection pump—like those used in direct-inject fuel systems. Direct-inject fuel systems sometimes require high fluid pressures (e.g., greater than 1,000 psi), and in order for the fuel injection pump to deliver such pressure it may have to operate in a manner that produces a significant amount of acoustic energy. This is particularly true for fuel injection pumps that are mechanically coupled to and driven by engine components, such as a camshaft. The acoustic cover described herein may be used to dampen or otherwise reduce the sound and/or vibrations emitted by a high-pressure fuel injection pump for a vehicle, such as those used in direct-inject fuel systems.

In one example, a high-pressure fuel injection pump may be mounted on top of an engine such that it is mechanically coupled to and driven off of an engine camshaft. This arrangement is different than most fuel injection pumps where the fuel pump is actually mounted within the fuel tank and is driven by an electric motor. Because of the different structure, location, drive mechanism, operating speed, output pressure and/or other factors, the high-pressure fuel injection pump for a direct-inject fuel system may produce noise and vibrations that have a higher frequency and/or intensity than those produced by conventional fuel injection pumps. A high-pressure fuel injection pump may, for example, emanate sound and/or vibrations in the 500-12,000 Hz range. Conventional noise damping and abatement solutions, like foam pads or mastic patches, may not sufficiently damp or mitigate this type of noise and vibration. Although the acoustic cover described below is provided in the context of a mechanically-driven, high-pressure fuel injection pump for a direct-inject vehicle fuel system, the acoustic cover may be used with any type of fuel pump or the like and is not limited to the exemplary embodiment provided herein. The acoustic cover may be used with gasoline engines (e.g., gasoline direct injection (GDI)) or with diesel engines (e.g., common rail fuel injection (CRFI)), to cite a few possibilities. Moreover, it is possible for the acoustic cover to be provided as an original part of the fuel pump housing or as a retrofit part designed to fit over an existing fuel pump housing.

Figure 1:
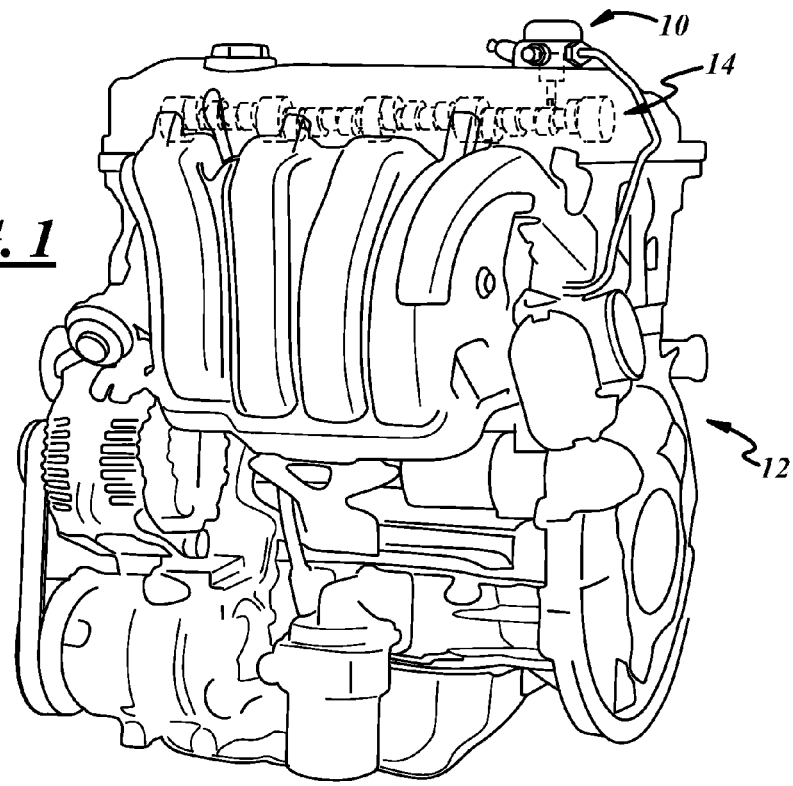
FIG. 1 is a perspective view of a direct inject engine that has an exemplary high-pressure fuel injection pump mounted thereto.

Turning now to FIG. 1, there is shown an exemplary high-pressure fuel injection pump 10 that is mounted on an engine 12 and is part of a direct-inject fuel system. Fuel injection pump 10 is mounted on top of engine 12—more particularly, on top of the cylinder head—and is mechanically coupled to a camshaft 14 such that rotation of the camshaft drives the fuel injection pump. By locating fuel injection pump 10 outside of the fuel tank and mechanically driving it with camshaft 14, as opposed to an electric motor, the pump is able to provide significantly high pressurized fuel to engine 12, but it also creates significant noise and vibration. These acoustic emissions may have a frequency and/or intensity that is greater than that produced by most conventional fuel injection pumps; thus, conventional noise reduction and abatement solutions may not be sufficient.

Figure 2:
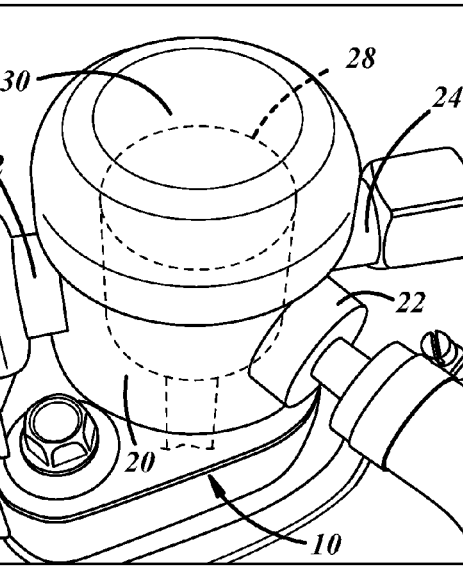
FIG. 2 is an enlarged perspective view of the high-pressure fuel injection pump from FIG. 1, where the fuel injection pump has an exemplary acoustic cover mounted thereto.

FIG. 2 is an enlarged view of the top of fuel injection pump 10, which includes a pump housing 20, an inlet 22, an outlet 24, a lid 26 and a pump device 28. Generally speaking, inlet 22 is in fluid communication with outlet 24 via pump device 28, which may include any type of suitable pumping mechanism and is contained within the confines of pump housing 20 and is driven by camshaft 14. In one example, pump device 28 receives fuel from inlet 22 at a first fluid pressure, provides fuel to outlet 24 at a second fluid pressure that is higher than the first fluid pressure, and is mechanically coupled to engine 12 so that mechanical output from the engine (e.g., rotation of camshaft 14) drives the pump device. Lid 26 is fitted on top of pump housing 20 and seals the fuel injection pump so that fuel does not leak out the top.

According to this particular embodiment, the acoustic cover described herein is a retrofit or aftermarket type part that is designed to be press-fit over top of lid 26. However, this is only one potential arrangement as the acoustic cover may actually be part of the original fuel pump housing instead of fitting over it afterwards. For instance, the acoustic cover may replace lid 26 (i.e., used in lieu of the lid) such that the acoustic cover is part of pump housing 20 and helps seal the top and/or sides of the fuel injection pump so that it does not leak fuel, as well as dampen noise and vibrations. Either arrangement is suitable. Skilled artisans will appreciate that the acoustic cover may be used with any number of different fuel pumps or other noise producing components, and that fuel injection pump 10 is only one example of a possible implementation or usage of the acoustic cover. Thus, a further detailed description of exemplary fuel injection pump 10 has been omitted.

With reference to FIGS. 3-6, there are shown several different views of an exemplary embodiment of acoustic cover 30, which may be fitted on top of fuel injection pump 10 in order to dampen or reduce sound and/or vibrations that emanate therefrom. According to this particular embodiment, acoustic cover 30 is made from a sound-damping metal laminate material and includes a top portion 40, a side portion 42, and a spacing feature 44. Acoustic cover 30 may be made entirely from the same sound-damping metal laminate material, or it may be made from different materials (e.g., it could include a single-layer stamped metal foundation and a separate sound-damping metal laminate patch applied to the top portion of the acoustic cover). In the exemplary embodiment shown here, acoustic cover 30 is entirely made from a sound-damping metal laminate material 50 that includes several layers of metal 52, 54, 56 and several layers of adhesive 60, 62. The exact number and sequence of metal and adhesive layers may vary; for example, sound-damping metal laminate material 50 may include two metal layers with a single adhesive layer in between, or it may include a single metal layer and a single adhesive layer that bonds the acoustic cover to the fuel injection pump.

Metal layers 52, 54, 56 act as a structural foundation for acoustic cover 30 and, depending on their intended application and use, may be made from any number of different materials, including metals such as stainless steel, galvanized steel, cold rolled steel (non-coated, coated, painted, etc.), aluminum, and alloys thereof. In one particular embodiment, the metal layers are made of stainless steel and have a thickness of about 0.3 mm to 0.7 mm. It is even possible to provide layers 52, 54, 56 in the form of a hard plastic or some other synthetic material. Adhesive layers 60, 62 bond the various metal layers together and can, depending on their composition and the particular application in which they are used, perform other functions such as sound and/or vibration damping. According to one exemplary embodiment, adhesive layers 60, 62 are viscoelastic adhesive layers that are comprised of an acrylate-based thermoset resin and have a thickness of about 0.005 mm to 0.05 mm, each; however, other adhesive compositions and thicknesses may be used as well. It is possible for adhesive layers 60, 62 to be specifically selected for their sound-damping versus temperature behavior. For example, adhesive layer 60 may be an ambient temperature adhesive (e.g., from about 10° C. to 20° C.) while adhesive layer 62 may be designed for damping sound at relatively high temperatures (e.g., from about 50° C. to 100° C.). By having adhesive layers that diminish or mitigate sound and/or vibrations across different temperature ranges, the overall sound-damping metal laminate material 50 may exhibit a wider temperature range response. This attribute can be particular useful in applications like the high-pressure fuel injection pump 10 described above which, due to its close proximity to engine 12, can experience a broad temperature range. The same may be true with regard to frequency response. For example, adhesive layer 60 may be designed to damp sound and/or vibrations in a first frequency range while adhesive layer 62 may be designed to damp sound and/or vibrations in a second frequency range that is different from the first. Depending on the materials used, metal layers 52, 54, 56 can originate from a coil of rolled stock material or from flat blanks that have already been blanked, trimmed, stamped, or otherwise metalworked into individual pieces. An overall thickness of about 0.5 mm to 2.5 mm may be useful for the sound-damping metal laminate material 50, as it is likely thick enough to provide a good acoustical response (i.e., good sound and/or vibration damping performance), yet thin enough so that the acoustical cover can be easily formed using a stamping, drawing, bending process, etc.

Acoustic cover 30 is designed to fit over the top of fuel injection pump 10, which is where much of the noise and vibrations emanate from, and to act in a constrained-layer damping capacity. Skilled artisans will appreciate that constrained-layer damping constructions can dissipate or otherwise mitigate vibrational or acoustic energy by utilizing shear and strain within the sandwich-like construction to convert vibrations into low-grade frictional heat. The metal layers 52, 54, 56 and the adhesive layers 60, 62 may be uniform or non-uniform in thickness and constituency, surface formations, etc. and may assume any suitable size and shape; they are not limited to the exemplary embodiment shown in the drawings. As mentioned above, it is also envisioned that sound-damping metal laminate material 50 could only include two metal layers with a single adhesive layer in between.

Top portion 40 opposes the top of fuel injection pump 10 when mounted and reduces noise and vibrations radiating therefrom. According to the exemplary embodiment shown here, top portion 40 is a generally flat and circular portion that includes inner and outer surfaces 70, 72, where the inner or underside surface 70 opposes the top of fuel injection pump 10 once the acoustic cover is mounted in place (best demonstrated in FIG. 3). Manufacturability, cost, sound-damping and structural integrity are just some of the considerations that may affect the structure and makeup of top portion 40. For instance, the inner and/or outer surfaces 70, 72 may be concave, convex, stippled or otherwise provided with different surface features to promote sound and vibration damping. In this particular embodiment, the top portion 40 of acoustic cover 30 is flat and smooth while the lid 26 of fuel injection pump 10 is recessed or indented; thus, producing a cavity 80 that is in between the fuel injection pump and the acoustic cover and that may further assist in noise and vibration reduction. This type of arrangement (i.e., recessed lid 26/cavity 80/flat acoustic cover 30) may be particular useful in sound-damping applications where a significant amount of noise and vibration emanates from the top of the fuel injection pump, as it does here. The dimensions of top portion 40 are primarily driven by the corresponding dimensions of fuel injection pump 10, but generally the top portion has an inner diameter (ID) that is large enough for the acoustic cover to fit over top of the fuel injection pump.

In the particular embodiment shown in FIG. 3, top portion 40 includes a solid surface that forms a cavity 80 between the top of the fuel injection pump and the acoustic cover. It is also possible, however, for top portion 40 to include one or more openings that pass through the acoustic cover and receive a pump inlet and/or outlet. Consider the example where outlet 24 extends from the top of fuel injection pump 10, instead of the side of the pump as shown in FIG. 2. In such an arrangement, top portion 40 may include an opening that is large to accommodate the outlet, yet small enough to prevent an unacceptable amount of sound and/or vibrations from emanating or escaping through the opening. It is also possible for top portion 40 to have multiple openings for one or more inlets and/or outlets, or for other items like wiring harnesses, etc.

Side portion 42 opposes the side of fuel injection pump 10 when mounted and also helps to dampen or diminish noise and vibrations that are produced by the fuel pump. In this particular embodiment, side portion 42 is an annular portion that is connected to top portion 40 by a circumferential edge 90 and generally has a height X all the way around such that the overall acoustic cover is of a closed cylindrical shape. Edge 90 may be rounded, tapered, squared-off, etc.; in this particular embodiment, the edge is rounded with a radius that is small enough to accommodate lid 26, on top of which it sits. Put differently, the radius of edge 90 is preferably smaller than the corresponding radius of lid 26 so that there is proper clearance between the two parts. The height X may be adjusted to accommodate the particular attributes of lid 26. For instance, height X may be of such a length that a bottom edge 92 of side portion 42 terminates above the inlet and/or outlets 22, 24 in the fuel injection pump; height X may be of such a length that bottom edge 92 terminates below the inlet and/or outlets 22, 24 (in this case holes or notched openings in side portion 42 may be needed to accommodate the inlets and/or outlets); or height X may vary along the circumference of side portion 42 instead of being a single uniform height, to name a few possibilities. In the case of a retrofit part (i.e., a separate acoustic cover attached over top of an existing lid), it is preferable that side portion 42 extend straight down from edge 90 and that height X be sufficiently long so that the acoustic cover can be crimped, deformed or otherwise press-fit around the outside of lid 26.

Spacing feature 44 is located between the lid 26 of the fuel injection pump and the acoustic cover 30 and is designed to discourage or disrupt the transmission of noise and vibration from the fuel injection pump to the acoustic cover by establishing a clearance 82 between the two parts. Spacing feature 44 may include any number of different materials and components designed to space or isolate the acoustic cover from the fuel injection pump, including adhesive, foam and rubber pieces, as well as stand-offs, shoulders or other features formed in fuel injection pump 10 and/or acoustic cover 30. In the example of an adhesive spacing feature 44, an adhesive bead (e.g., an anaerobic adhesive similar to a thread-lock that bonds when the acoustic cover is seated on the fuel injection pump) may be applied to the underside surface 70 of the acoustic cover and/or the upper surface of lid 26. Such a bead may be a continuous annular bead or it can be in the form of discontinuous adhesive sections. This can have the effect of both bonding acoustic cover 30 to fuel injection pump 10, as well as separating the two parts by a small clearance 82 so that they are not in physical contact with one another—physical contact can promote the transmission of vibrational energy. In another adhesive spacing feature embodiment, a bead of temperature-specific sound-damping adhesive is used to bond acoustic cover 30 to fuel injection pump 10 so that one of the adhesive layers can be omitted from the exemplary three-layer sound-damping metal laminate material 50. Put differently, by using a sound-damping adhesive layer as spacing feature 44, the overall structure would already be sound damped for that particular temperature range and a sound-damping metal laminate material 50 having only a single adhesive layer could be used instead. This reduces the number of metal layers and adhesive layers in laminate material 50. In yet another adhesive spacing feature embodiment, it is possible to coat or otherwise apply adhesive to a majority or the entire underside of acoustic cover 70 (including the top portion 40 and/or the side portion 42) so that a majority or the entire interface between the acoustic cover and the fuel injection pump includes an intervening adhesive layer. Other adhesive patterns and applications are certainly possible as well.

In a different embodiment, spacing feature 44 may include an annular ring or separate pieces of foam, rubber, or some other damping material to prevent the acoustic cover from physically touching the fuel injection pump across clearance 82. In another embodiment, a stand-off or shoulder could be formed on the inside of acoustic cover 30 and/or the outside of lid 26 so that clearance 82 is maintained. For instance, the height X of acoustic cover 30 may be specifically selected so that when the acoustic cover is inserted on top of the fuel injection pump and bottom edge 92 contacts a pump inlet and/or outlet, a specific clearance 82 is maintained. Clearance 82 can dimensionally vary and may include very small gaps or clearances.

It is not necessary for clearance 82 to be located underneath the top portion 40 of the acoustic cover and could be located instead between side portion 42 and the fuel injection pump. In such a case, the underside surface 70 of top portion 40 may or may not rest on the top of lid 26, so long as a gap or spacing is maintained between the sides of the acoustic cover and the fuel injection pump. To summarize some of the different potential embodiments, spacing feature 44 may include different materials including adhesives, foams, rubbers, etc., it may be located between the top portion 40 and/or the side portion 42 of the acoustic cover and the fuel injection pump, and it may create a corresponding clearance 82 between the top portion 40 and/or the side portion 42 of the acoustic cover and the fuel injection pump, to name a few. In one embodiment, acoustic cover 30 is mounted on top of fuel injection pump 10 such that a clearance 82 is established between the underside surface 70 of the acoustic cover and the top of lid 26, and side portion 42 is crimped onto or otherwise in mechanical engagement with the side of fuel injection pump 10 (illustrated in FIG. 3). The mechanical engagement or contact between fuel injection pump 10 and acoustic cover 30 causes the two components to be acoustically coupled to one another so that sound and/or vibrations that emanate from the fuel injection pump are transferred to and damped by the acoustic cover.

It should be appreciated, however, that spacing feature 44 and clearance 82 are not necessary and may be omitted altogether. It is possible, for example, for acoustic cover 30 to be directly attached to fuel injection pump 10 such that no cavity 80 and/or clearance 82 is created. Some vibrational energy may be transmitted from the fuel injection pump to the acoustic cover, so that the acoustic cover can dampen or dissipate this energy. In an exemplary embodiment, sound and/or vibrations having a frequency between 500 Hz and 12,000 Hz are received from high-pressure fuel injection pump 10 at acoustic cover 30 through a mechanical engagement between these two components, and the sound and/or vibrations are damped by converting at least some of the acoustic energy into thermal energy within sound-damping metal laminate material 50. In a more specific embodiment, the sound-damping metal laminate material damps sound and/or vibrations having a frequency between 2,000 Hz and 9,000 Hz.

According to one potential embodiment for manufacturing and mounting acoustic cover 30, a sound-damping metal laminate material 50 is first formed. Once this material has been properly laminated and cured, circular or other shaped parts may be stamped, blanked or otherwise formed from sound-damping metal laminate material 50. The stampings can then be drawn or otherwise formed into the closed-cylindrical or cup-like shape shown in the drawings. It may be desirable to restrike the drawn parts to make sure that their inner-diameter and/or other critical dimensions are suitable for press-fitting onto the fuel injection pumps, and to cut off the offal after stamping. Once the acoustic cover 30 is formed, a bead of adhesive or other spacing feature 44 may be added, and then the acoustic cover can be mounted atop the fuel injection pump. It may be necessary to exert pressure on acoustic cover 30 so that it is pressed tightly onto the fuel injection pump; this may also be needed for kicking off the anaerobic adhesive, if one is used. Once properly adhered, the side portion 42 of the acoustic cover is crimped or otherwise deformed so that a mechanical lock is formed between the acoustic cover and the fuel injection pump. Of course, a different process may be used to manufacture and mount acoustic cover 30 to fuel injection pump 10, including those with more, less and/or a different combination of steps.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the acoustic cover 30 may be used with a fuel injection pump having a flat top or lid 26, instead of the indented or recessed one shown in the drawings. Also, it possible to omit spacing feature 44 and to directly attach the acoustic cover to the fuel injection pump. It is further possible to design acoustic cover 30 so that it is actually part of the pump housing, as opposed to being a retrofit part designed to fit over top of a pump housing. All such other embodiments, changes, and modifications are intended to come within the scope of the appended claims.

As used in this specification and claims, the terms "for example", "e.g.," "for instance", "like", and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. An acoustic cover for a fuel injection pump, comprising:
a top portion being sized and shaped to fit over top of the fuel injection pump and including an inner surface and an outer surface, the top portion is configured so that when the acoustic cover is mounted on the fuel injection pump a cavity is formed between the inner surface of the top portion and the fuel injection pump; and
a side portion extending from the top portion and being sized and shaped to mechanically engage a side of the fuel injection pump, wherein at least one of the top portion or the side portion includes a sound-damping metal laminate material that damps sound, vibrations, or both that emanate from the fuel injection pump.

2. The acoustic cover of claim 1, wherein the top portion is a circular portion that opposes a top of the fuel injection pump when mounted, the side portion is an annular portion that opposes a side of the fuel injection pump when mounted, and the side portion is connected to and extends from the top portion by a circumferential edge such that the overall acoustic cover generally has a closed-cylindrical shape.

3. The acoustic cover of claim 2, wherein the top portion includes an opening that passes through the acoustic cover and receives at least one of an inlet or an outlet extending from the top of the fuel injection pump.

4. The acoustic cover of claim 2, wherein the side portion extends from the top portion by a height (X) and a bottom edge of the side portion terminates above at least one of an inlet or an outlet in the fuel injection pump.

5. The acoustic cover of claim 2, wherein the side portion extends from the top portion by a height (X) and a bottom edge of the side portion terminates below at least one of an inlet or an outlet in the fuel injection pump, the side portion includes a notched opening that accommodates the at least one of the inlet or outlet.

6. The acoustic cover of claim 1, wherein the side portion has an inner dimension (ID) that corresponds to an outer dimension of the fuel injection pump when mounted so that the acoustic cover is press-fit to the fuel injection pump.

7. The acoustic cover of claim 1, wherein the sound-damping metal laminate material includes at least one viscoelastic adhesive layer located between a plurality of metal layers.

8. The acoustic cover of claim 7, wherein the sound-damping metal laminate material includes a first viscoelastic adhesive layer that damps sound, vibrations, or both at a first temperature range and a second viscoelastic adhesive layer that damps sound, vibrations, or both at a second temperature range that is different than the first temperature range.

9. The acoustic cover of claim 7, wherein the sound-damping metal laminate material includes a first viscoelastic adhesive layer that damps sound, vibrations, or both at a first frequency range and a second viscoelastic adhesive layer that damps sound, vibrations, or both at a second frequency range that is different than the first frequency range.

10. The acoustic cover of claim 1, further comprising a spacing feature that is located between a top of the fuel injection pump and the top portion of the acoustic cover when mounted, the spacing feature includes at least one item selected from the group consisting of: adhesive, foam, rubber, or stand-off features formed in the acoustic cover or the fuel injection pump.

11. The acoustic cover of claim 1, wherein the acoustic cover is mounted to a high-pressure fuel injection pump that is mechanically coupled to a vehicle engine and provides pressurized fuel of at least 1,000 psi, and the sound-damping metal laminate material damps sound, vibrations, or both that have a frequency between 500 Hz and 12,000 Hz and emanate from the high-pressure fuel injection pump.

12. An acoustic cover for a fuel injection pump, comprising:
   a top portion being sized and shaped to fit over a top of the fuel injection pump when mounted;
   a spacing feature applied to an underside of the top portion and forming a clearance with the top of the fuel injection pump when mounted; and
   a side portion being sized and shaped to mechanically engage a side of the fuel injection pump when mounted, wherein the side of the fuel injection pump and the side portion of the acoustic cover are acoustically coupled to one another so that sound, vibrations, or both that emanate from the fuel injection pump are directly transferred to the side portion and damped by the acoustic cover, and the top of the fuel injection pump and the top portion of the acoustic cover are acoustically separated from one another by the clearance so that sound, vibrations, or both that emanate from the fuel injection pump cannot be directly transferred to the top portion.

13. The acoustic cover of claim 12, wherein the top portion is a circular portion that opposes a top of the fuel injection pump when mounted, the side portion is an annular portion that opposes a side of the fuel injection pump when mounted, and the side portion is connected to and extends from the top portion by a circumferential edge such that the overall acoustic cover generally has a closed-cylindrical shape.

14. The acoustic cover of claim 12, wherein at least one of the top portion or the side portion includes a sound-damping metal laminate material having at least one viscoelastic adhesive layer located between a plurality of metal layers.

15. The acoustic cover of claim 14, wherein the sound-damping metal laminate material includes a first viscoelastic adhesive layer that damps sound, vibrations, or both at a first temperature range and a second viscoelastic adhesive layer that damps sound, vibrations, or both at a second temperature range that is different than the first temperature range.

16. The acoustic cover of claim 14, wherein the sound-damping metal laminate material includes a first viscoelastic adhesive layer that damps sound, vibrations, or both at a first frequency range and a second viscoelastic adhesive layer that damps sound, vibrations, or both at a second frequency range that is different than the first frequency range.

17. The acoustic cover of claim 12, wherein the acoustic cover is mounted to a high-pressure fuel injection pump that is mechanically coupled to a vehicle engine and provides pressurized fuel of at least 1,000 psi, and the sound-damping metal laminate material damps sound, vibrations, or both that have a frequency between 500 Hz and 12,000 Hz and emanate from the high-pressure fuel injection pump.

18. A high-pressure fuel injection pump for a vehicle, comprising:
   a pump housing;
   an inlet in the pump housing;
   an outlet in the pump housing;
   a recessed lid fitted on top of the pump housing;
   a pump device receiving fuel from the inlet at a first fluid pressure, providing fuel to the outlet at a second fluid pressure that is higher than the first fluid pressure, and being mechanically coupled to a vehicle engine so that mechanical output from the vehicle engine drives the pump device; and
   an acoustic cover having a top portion and a side portion and being sized and shaped so that the acoustic cover fits over top of the pump housing and is mounted to a side of the pump housing so as to form a cavity between the recessed lid of the pump housing and the top portion of the acoustic cover, wherein the acoustic cover includes a sound-damping metal laminate material that dampens noise, vibrations or both emanating from the high-pressure fuel injection pump.

19. A method for damping sound, vibrations, or both that emanate from a high-pressure direct injection fuel pump, comprising the steps of:
   (a) providing an acoustic cover that includes a top portion and a side portion, wherein at least one of the top portion and the side portion is made from a sound-damping metal laminate material;
   (b) mounting the acoustic cover to the high-pressure direct injection fuel pump via a mechanical engagement between a side of the high-pressure direct injection fuel pump and the side portion of the acoustic cover, the mechanical engagement causes the high-pressure direct injection fuel pump and the acoustic cover to be acoustically coupled to one another;
   (c) receiving sound, vibrations, or both having a frequency between 500 Hz and 12,000 Hz from the high-pressure direct injection fuel pump at the acoustic cover via the mechanical engagement; and
   (d) damping the sound, vibrations, or both by converting at least some of the acoustic energy associated with the sound, vibrations, or both into thermal energy within the sound-damping metal laminate material.

\* \* \* \* \*